US007151819B2

(12) United States Patent
Zellner et al.

(10) Patent No.: US 7,151,819 B2
(45) Date of Patent: *Dec. 19, 2006

(54) END-TO-END NETWORK TESTING

(75) Inventors: Samuel N. Zellner, Dunwoody, GA (US); Mark Enzmann, Roswell, GA (US); Robert T. Moton, Alpharetta, GA (US); Nathan Sargent, Ackworth, GA (US)

(73) Assignee: BellSouth IP Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/028,145

(22) Filed: Jan. 3, 2005

(65) Prior Publication Data

US 2005/0147210 A1    Jul. 7, 2005

Related U.S. Application Data

(63) Continuation of application No. 09/752,600, filed on Dec. 29, 2000, now Pat. No. 6,853,708.

(51) Int. Cl.
*H04M 1/24* (2006.01)
(52) U.S. Cl. .................. 379/27.03; 379/27.01; 379/27.02; 379/22.02; 379/10.02
(58) Field of Classification Search ............ 379/27.01, 379/27.02, 27.03, 22.02, 10.02
See application file for complete search history.

(56) References Cited

U.S. PATENT DOCUMENTS 6,195,416 B1 *   2/2001   DeCaluwe et al. ...... 379/32.05
6,370,159 B1 *   4/2002   Eidson ....................... 370/503
6,594,344 B1 *   7/2003   Masri et al. ............. 379/27.01
6,775,240 B1 *   8/2004   Zhang et al. ............... 370/251
6,847,691 B1 *   1/2005   Torikoshi et al. ........... 375/354
6,853,708 B1 *   2/2005   Zellner et al. ........... 379/27.03

OTHER PUBLICATIONS

Abate et al., "AT&T's New Approach to the Synchronization of Telecommunication Networks", IEEE Communications Magazine, Apr. 1989, pp. 35-45.*

* cited by examiner

*Primary Examiner*—Barry Taylor
(74) *Attorney, Agent, or Firm*—Lee & Hayes, PLLC

(57) ABSTRACT

The invention includes a system and a method for testing a communication network. The inventive method transmits a first signal from a first point to a second point of the communication network, where the first and the second points are remotely located. The inventive method further includes recording a first time value of the transmitting of the first signal using a first clock, receiving a second signal at the second point of the communication network, and recording a second time value of the receiving using a second click. The first clock and the second clock operate from a substantially similar reference. The method may further include comparing the first signal and the second signal as a function of the first and second time values. Also, the method may determine at least one performance characteristic of the communication network based on the comparison.

19 Claims, 5 Drawing Sheets

END-TO-END NETWORK TESTING

CROSS-REFERENCE TO RELATED CASES

This application is a continuation of U.S. patent application Ser. No. 09/752,600 filed Dec. 29, 2000 now U.S. Pat. No. 6,853,708, entitled "End-To-End Network Testing" which is herein incorporated by reference in its entirety.

TECHNICAL FIELD

The invention relates to the field of communication networks. More specifically, the invention relates to the end-to-end testing of communication networks.

BACKGROUND OF THE INVENTION

For decades, voice-based communication networks have carried analog signals between customer premise equipment (CPE), like telephones, via central office facilities over the public switched telephone network (PSTN). To date, testing of these communication networks has focused on testing the two-wire copper connection between the CPEs and their central offices (i.e., the "loop"), and/or testing the CPEs themselves. For example, Mechanized Loop Testing has been the primary means of measuring line signal levels and losses on the loop. In addition, equipment capable of testing telephones has been developed and is widely used in the field.

Although loop and CPE testing are common, end-to-end testing of the entire communication path from one CPE to another, for example, is limited by the inability to correlate measurements taken at the CPEs. The inability to correlate the measures often is the result of the great distances that frequently separate the CPEs. In particular, a connection from one CPE to another may span various networks and travel through a multitude of switching points. Recent deregulation has divided ownership of these networks and switching points among distinct service providers. Therefore, the inability to coordinate the many efforts necessary to conduct such testing has frustrated such end-to-end testing.

Yet, at the same time network ownership has become more fragmented, customer communication needs have become more global. Consequently, the need for testing the corresponding communication paths also has become more global (i.e., end-to-end) with the advent of the Internet, for example. Moreover, this need has become more prominent by the global transmission of digital signals that are more sensitive to transmission faults than their analog counterparts.

Therefore, there is a need for an end-to-end test solution that permits measurements taken at each end of the network to be properly correlated and analyzed.

SUMMARY OF THE INVENTION

The invention includes a system and a method for testing a communication network. The inventive method transmits a first signal from a first point to a second point of the communication network, where the first and the second points are remotely located. The inventive method further includes recording a first time value of the transmitting of the first signal using a first clock, receiving a second signal at the second point of the communication network, and recording a second time value of the receiving using a second clock. The first clock and the second clock operate from a substantially similar reference. The method further may include comparing the first signal and the second signal as a function of the first and second time values. Also, the method may determine at least one performance characteristic of the communication network based on the comparison. The performance characteristics may include signal delay, signal distortion, signal duplication, signal intensity, and/or signal-to-noise ratio. The inventive method further may generate a reference signal using a Stratum-2 oscillator, for example, and provide the reference signal to the first and second clocks. The first and second points of the communication network may be customer premise equipment, and/or may be devices located within different central offices. The inventive method also may receive a clock signal at the first and second clocks, for example, from a satellite.

The inventive system includes a signal generator for providing a first signal to the communication network, and a first clock device coupled to the signal generator, such that the first clock device records a first time that the first signal is provided to the communication network. The system also includes a signal receiver for receiving a second signal from the communication network, and a second clocking device coupled to the signal receiver, such that the second clock device records a second time the second signal is received from the communication network. The first and second clocking devices operate from a substantially similar reference, and exhibit long-term frequency stability characteristics at least as good as a Stratum-2 level. The system also may include a clock signal in communication with the first and second clocking devices such that the first and second clocking devices operate from a substantially similar reference. The clock signal may be transmitted by a satellite to a first satellite receiver in communication with the first clock and a second satellite receiver in communication with the second clock. The system also may include a first customer premise equipment in communication with the signal generator and the communication network, and a second customer premise equipment in communication with the signal receiver and the communication network. The system also may include a first central office device in communication with the signal generator and the communication network, and a second central office device in communication with the signal receiver and the communication network.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Overview of Communication Network

Figure 1:
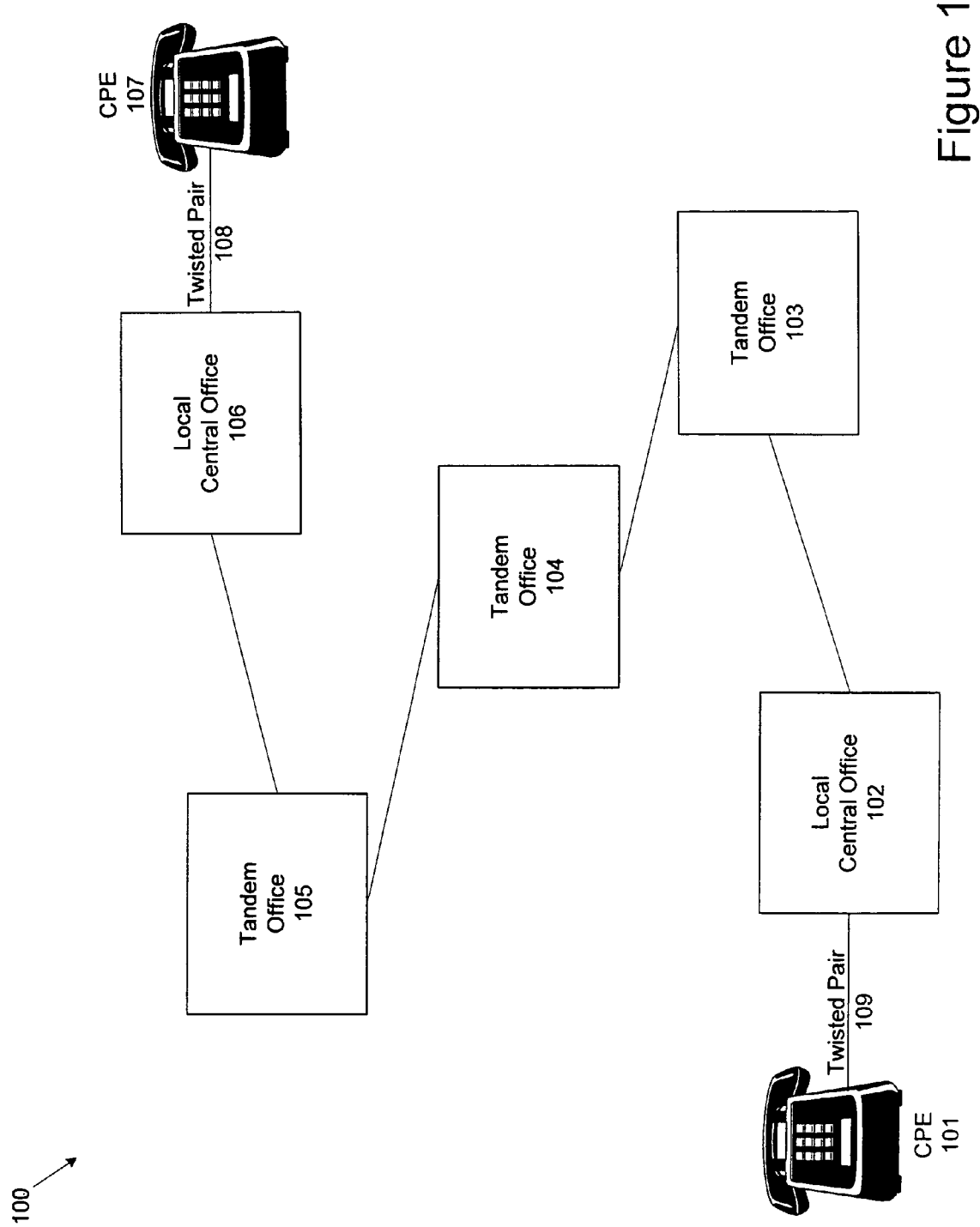
FIG. 1 provides an overview of a communications network for transferring voice and data from one end of a network to another.

FIG. 1 provides an overview of a communications network 100 for transferring voice and data from one end of a network to another. As shown in FIG. 1, customer premise equipment (CPE) 101 is coupled to a local central office 102 via a twisted pair connection 109. Twisted pair connection 109, commonly referred to by those skilled in the art as the "loop," includes a two-wire connection between CPE 101 and local central office 102.

Local central office 102 is "local" because of its relative proximity to CPE 101. Local central office 102, also known as a local exchange, is a physical plant facility that includes equipment capable of electronically switching incoming calls to their desired destinations. In general, the central office is a major equipment center designed to serve the communications traffic of a specific geographic area. The central office is a Class 5 switch with lines to customer locations. Central offices usually have a capacity of 100,000 telephone lines, and up to 10 network exchanges. Central offices typically are owned by incumbent local exchange carriers (ILEC), also known as bell operating carriers (BOC).

Local central office 102 is further coupled to a tandem office 103. Tandem office 103 further is coupled to a tandem office 105 via a tandem office 104. Generally, tandem offices, also well known to those skilled in the art as "toll offices," are Class 4 switches that provide interconnection for central offices and long distance via Inter-exchange Carriers (IEC). Tandem office 105 further is coupled to a local central office 106. It should be appreciated that the number of tandem offices located between local central office 102 and local central office 106 will vary depending on the geographic location of CPE 101 and CPE 107. FIG. 1 shows three tandem offices for the purpose of brevity and discussion.

Local central office 106 is coupled to CPE 107 via a twisted pair connection 108. Twisted pair connection 108 is similar to twisted pair connection 106 in that it also couples the CPE to the local central office, and forms the "loop" between CPA 107 and local central office 106. In the case of local central office 106 it is "local" relative to CPE 107.

In operation CPE 101, which may be a standard telephone device, sends analog and/or digital signals over twisted pair connection 109 to local central office 102. As previously discussed, local central office 102 includes computer equipment capable of logically directing the analog and/or digital signals from CPE 101 to tandem office 103. Similarly, tandem offices 103–105 have computer equipment capable of routing the analog and/or digital signals from local central office 102 to local central office 106. Therefore, local central offices 102 and 106, and tandem offices 103–105 function to permit the transmission of analog and/or digital signals from CPE 101 to CPE 107.

The analog and/or digital signals from CPE 101 initially may include information corresponding to a network identifier of CPE 107, for example, an Internet Protocol address and/or a directory number. Subsequent analog signals from CPE 101 also typically include signals corresponding to voice-based signals from a user's voice, communicated through CPE 101. Alternatively, the subsequent analog signals may correspond to signals from a computing device, like a computer, that have been converted from digital form to analog form by a modem, for example. The subsequent digital signals from CPE 101 may include information transmitted directly from a computing device, like a personal computer. Regardless of the type and content of the transmitted signals, local central office 102 and 106, and tandem offices 103–105 operate to permit a user of CPE 101 to communicate with another user of CPE 107, where the CPE may be a telephone or a computer, for example.

It should be appreciated that the number of tandem offices located between CPE 101 and CPE 107 will vary depending upon the relative geographic location of CPE 101 to CPE 107. For example, although not shown in FIG. 1, where CPE 101 and CPE 107 are in close proximity (e.g., within the same town), it may be that they are connected through a single local central office, for example local central office 102. Alternatively, where CPE 101 and CPE 107 are remotely located (e.g., different countries), it may be that a significant number of tandem offices operate to permit CPE 101 to communicate with CPE 107. Although, telephone devices are shown to represent CPE 101 and 107, it should be appreciated that other equipment may be included, for example, facsimile machines, computers, and modems. Therefore, FIG. 1 provides an overview of communications network 100 for transferring voice and data from one CPE to another CPE.

End-to-End Testing of Communication Network

Figure 2:
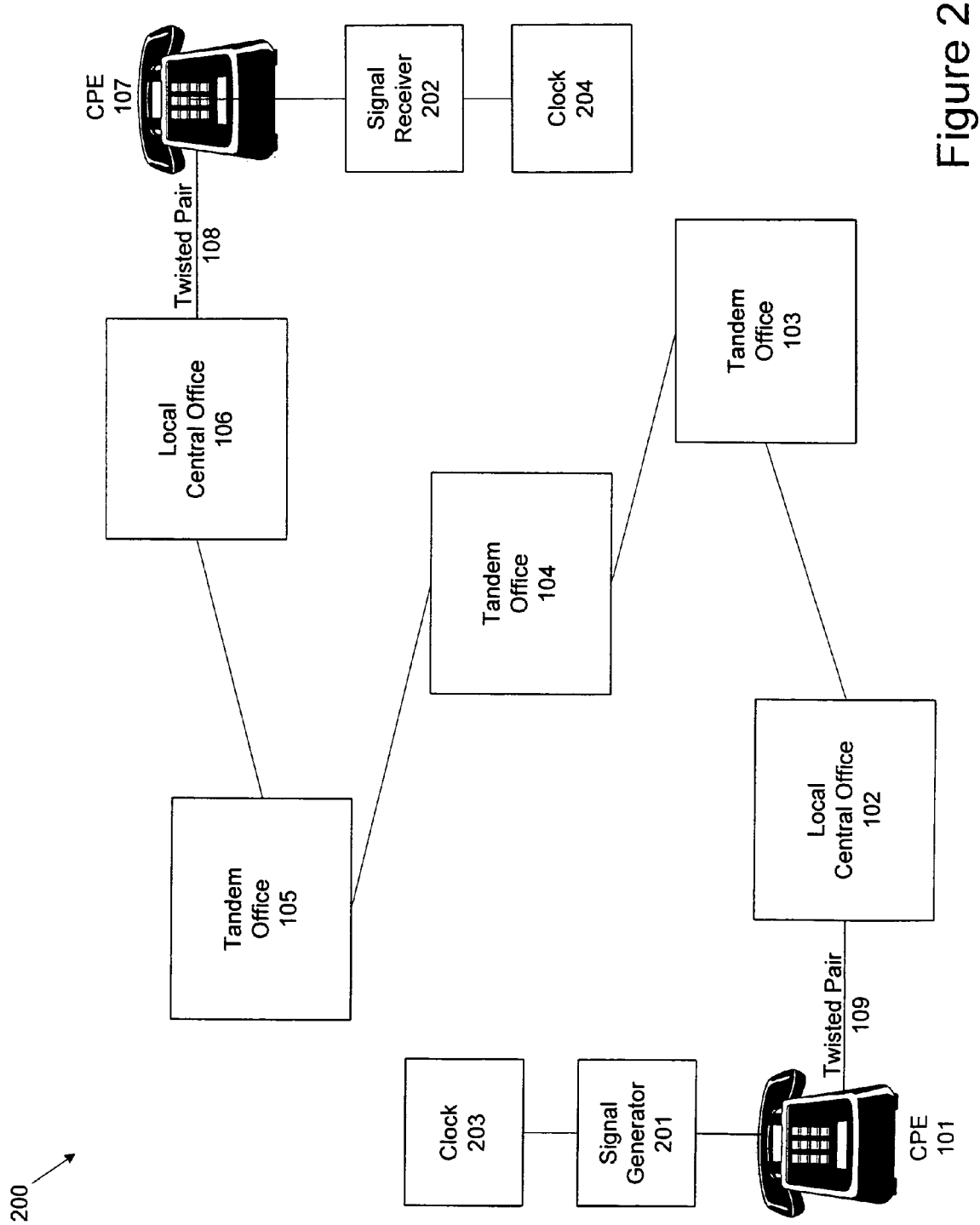
FIG. 2 is a block diagram illustrating a system for testing a communication network, according to the invention.

FIG. 2 is a block diagram illustrating a system 200 for testing a communication network, according to the invention. As shown in FIG. 2, a signal generator 201 and a clock 203 are coupled to CPE 101. Similarly, a signal receiver 202 and clock 204 are coupled to CPE 107. Signal generator 201 is a device capable of transmitting a signal in a selected frequency range, for example an audio signal. Signal generator 201 also is capable of recording certain characteristics of the transmitted signal, for example signal strength and signal frequency. Signal receiver 202 is a device capable of receiving the signal transmitted from signal generator 201. Signal receiver 202 also is capable of recording certain characteristics of the received signal, for example signal strength and signal frequency.

Clocks 203 and 204 are timing devices that operate from a substantially similar point of reference. This may be accomplished using a number of techniques. For example, clocks 203 and 204 may be devices capable of maintaining a certain reference time (e.g., time of day) within a significant degree of accuracy, for example a Stratum clock. Stratum clocks are devices well known to those skilled in the art to provide highly accurate tracking of an input reference time. For example, the Stratum-2 clock has a drift of the original input reference that is less than $1.6 \times 10^{-8}$ in one year. The short term drift of the Stratum-2 clock is less than $1 \times 10^{-10}$ in twenty-four hours. The remaining components shown in FIG. 2 are similar to those discussed with reference to FIG. 1.

In operation, signal generator 201 transmits a signal to local central office 102 over twisted pair connection 109. Clock 203 records a time (e.g., time of day) at which signal generator 201 transmits the signal. Although FIG. 2 shows signal generator 201 and clock 203 transmitting the signal through CPE 101, it should be appreciated that signal generator 201 and a clock 203 may be coupled directly to local central office 102 via twisted pair connection 109. This may be accomplished by coupling signal generator 201 to twisted pair connection 109. Also, it should be appreciated that signal generator 201 and clock 203 may be a single unit capable of transmitting the signal and recording the time at which the signal is transmitted.

In similar fashion, signal receiver 202 and clock 204 function to receive the transmitted signal from local central office 106 via twisted pair 108. Clock 204 operates to provide a time (e.g., time of day) that the signal is received from local central office 106 via twisted pair connection 108. Although FIG. 2 shows signal receiver 202 and clock 204 receiving the signal through CPE 107, it should be appreciated that signal receiver 202 and clock 204 may be coupled directly to local central office 106 via twisted pair connection 108. This may be accomplished by coupling signal receiver 202 to twisted pair connection 108. Also, it should be appreciated that signal receiver 202 and clock 204 may be a single unit capable of transmitting the signal and recording the time at which the signal is transmitted.

By measuring the signal transmitted by signal generator 201 and the signal received by signal receiver 202, and correlating those measurements using the corresponding clock values, the transmitted and received signals may be compared so as to measure the performance characteristics of the communication network. Such performance characteristics are determined from a first end of the communication network (e.g., CPE 101) to a second end of the communication network (e.g., CPE 107). These characteristics may include signal delay, signal distortion, signal duplication, signal intensity, and/or signal-to-noise ratio.

Figure 3:
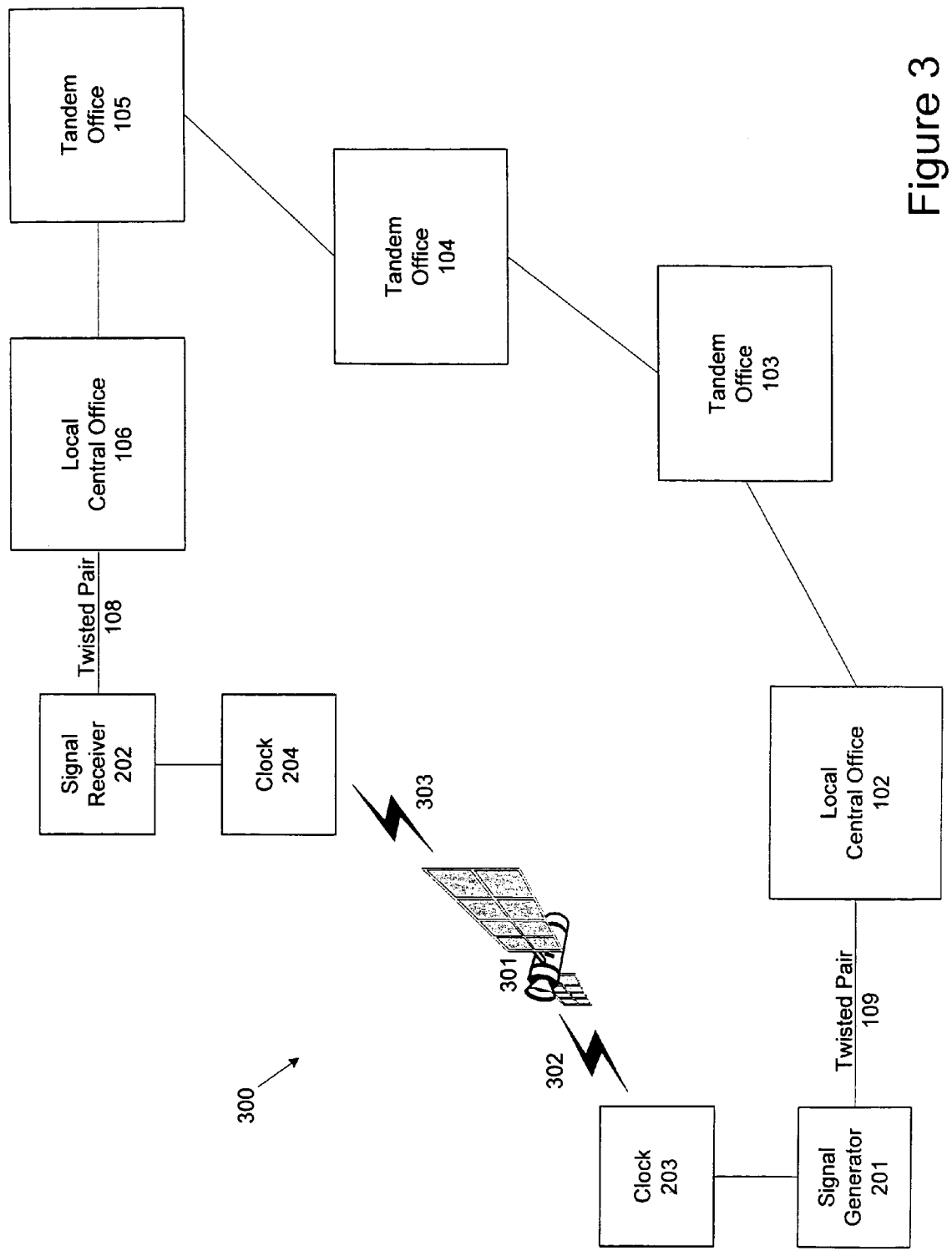
FIG. 3 is a block diagram illustrating another system for testing a communication network, according to the invention.

FIG. 3 is a block diagram illustrating a system 300 for testing a communication network, according to the invention. As shown in FIG. 3, a satellite 301 provides signals 302 and 303 to clock 203 and clock 204, respectively. Signals 302 and 303 may provide highly accurate timing updates to clocks 203 and 204. Also, because signals 302 and 303 are received from a single common source (i.e., satellite 301), clocks 203 and 204 may operate from a substantially similar point of reference. In this case, clocks 203 and 204 also may include a global positioning satellite receiver (not shown), capable of receiving satellite signals 302 and 303 and updating clocks 203 and 204 accordingly. Other than the use of satellite 301 to update clocks 203 and 204 with signals 302 and 303, respectively, system 300 and its operation are similar to that discussed with reference to system 200 in FIG. 2.

Figure 4:
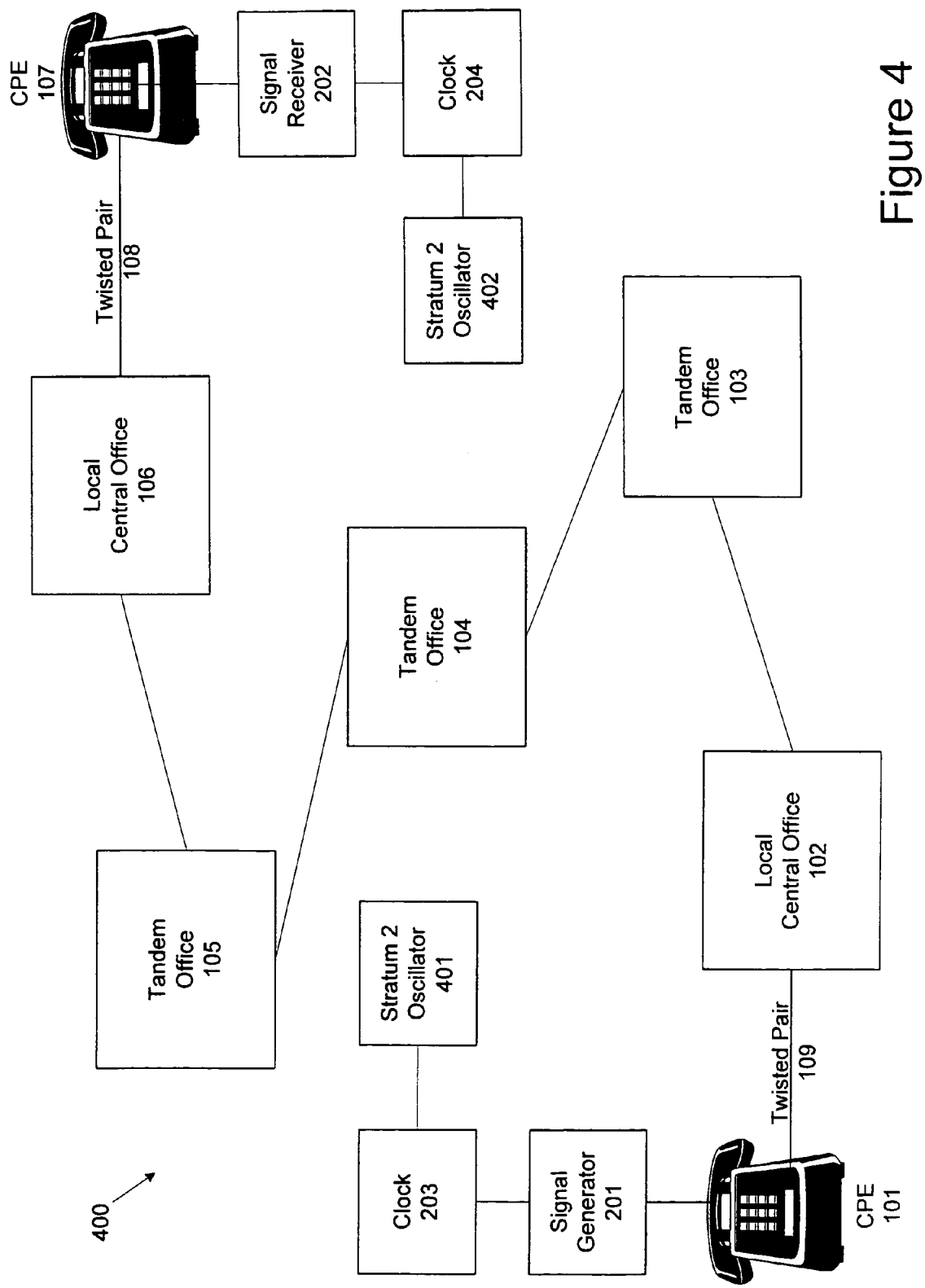
FIG. 4 is a block diagram illustrating another system for testing a communication network, according to the invention.

FIG. 4 is a block diagram illustrating a system 400 for testing a communication network, according to the invention. As shown in FIG. 4, a Stratum-2 oscillator 401 is coupled to clock 203, and Stratum-2 oscillator 402 is coupled to clock 204. Stratum-2 oscillators 401 and 402 provide a highly consistent timing source to clocks 203 and 204, respectively, such that they may maintain a substantially similar timing point of reference. Although not shown in FIG. 4, it should be appreciated that the Stratum-2 oscillators individually may be incorporated within clocks 203 and 204. Also, although FIG. 4 shows clocks 203 and 204 individually coupled to Stratum-2 oscillators 401 and 402, respectively, it should be appreciated that another similar timing device exhibiting long-term frequency stability characteristics at least as good as a Stratum-2 level also may be used. Other than the use of Stratum-2 oscillators 401 and 402 to provide update signals to clocks 203 and 204, respectively, system 400 and its operation are similar to that discussed with reference to system 200 in FIG. 2.

Figure 5:
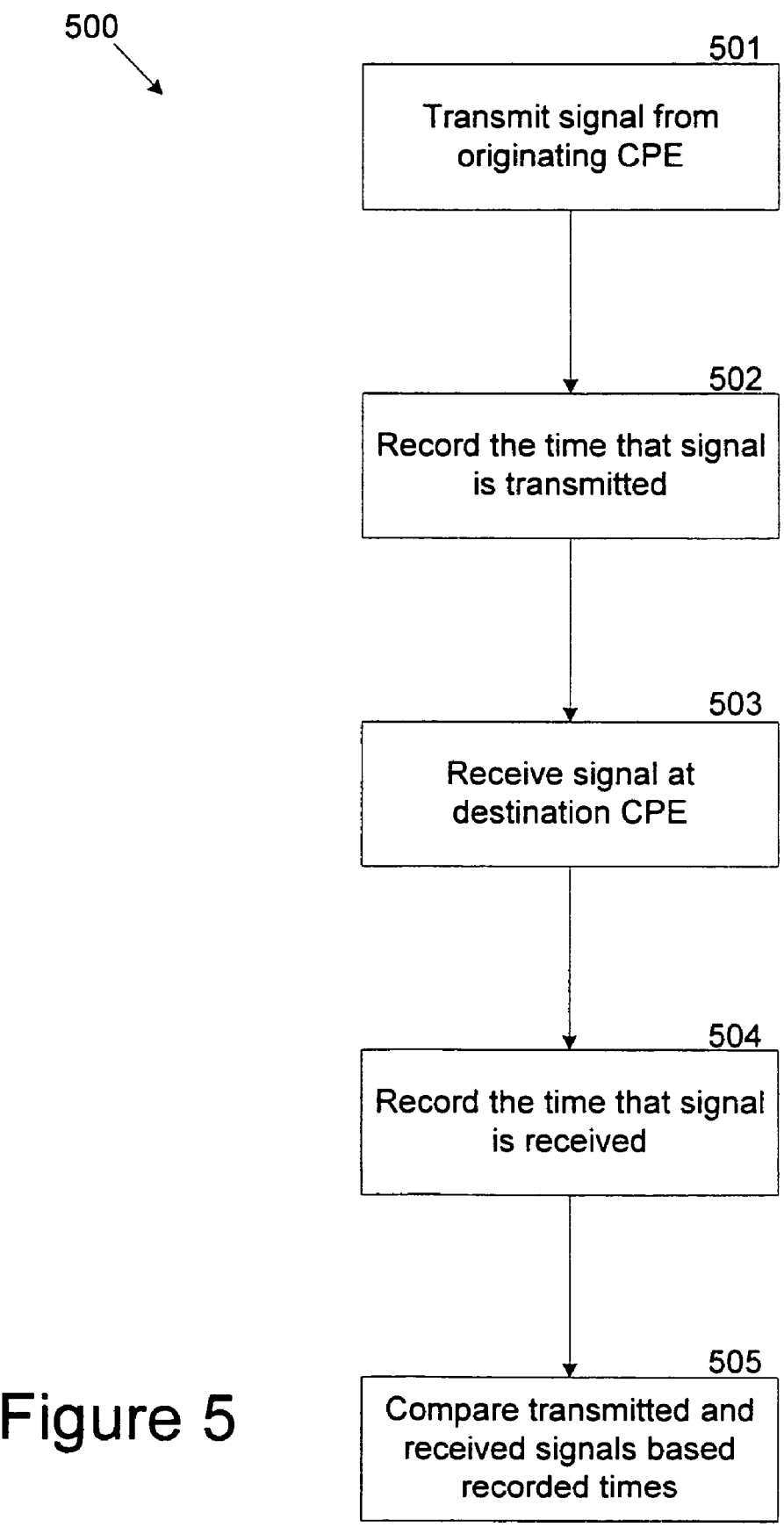
FIG. 5 is a flow chart illustrating a method for testing a communication network, according to the invention.

FIG. 5 is a flow chart illustrating a method 500 for testing a communication network, according to the invention. In step 501, signal generator 201 transmits a signal to local central office 102 over twisted pair connection 109. Signal generator 201 measures and records certain values of the transmitted signal. Clock 203 records a time that the signal is transmitted onto twisted pair connection 109, in step 502.

The signal is then transmitted to signal receiver 202 over tandem offices 103–105, local central office 106, twisted pair connection 108, and CPE 107. In step 503, the signal is received at signal receiver 202. Signal receiver 202 measures and records certain values of the transmitted signal. In step 504, clock 204 records a time that the signal is received.

In step 505, the recorded signal values and corresponding time values for the transmitted and received signals are compared so as to determine performance characteristics of the communication network. For example, the following characteristics may be determined from the recorded information: signal delay, signal distortion, signal duplication, signal intensity, and/or signal-to-noise ratio. It should be appreciated that these characteristics are not exhaustive and are provided as an example of possible performance characteristics that may be determined. In practice, the timing correlation of the transmitted and received signals permits a variety of relevant comparisons to be accomplished and determinations about the performance of the network to be made.

The invention is directed to a system and method for testing a communication network. The invention was described in the context of wired voice and data communication system, but is not so limited to, regardless of any specific description in the drawing or examples set forth herein. For example, the invention may be applied to wireless networks, and non-traditional networks like Voice-over-IP-based networks. It will be understood that the invention is not limited to use of any of the particular components or devices herein. Indeed, this invention can be used in any application that requires the testing of a communications system. Further, the system disclosed in the invention can be used with the method of the invention or a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A method for testing a communication network, comprising:

transmitting at least a first signal from a first point to at least a second point of said communication network, wherein said first and said second points of the communication network are remotely located from one another;

recording a first time value of said transmitting using a first clock;

obtaining a first measurement of at least one performance characteristic of the first signal at the first point of the communication network;

correlating the first measurement with the first time value;

receiving the first signal at said second point of said communication network;

recording, at the second point of said communication network, at least a second time value of said receiving using at least a second clock, wherein said first clock and said second clock respectively operate locally from a substantially similar reference;

obtaining at least a second measurement of the performance characteristic of the first signal as received at the second point of the communication network;

correlating the second measurement with the second time value;
comparing said first measurement and said second measurement of the performance characteristic as a function of said first and second time values; and
determing at least one end-to-end performance characteristic of said communication network based on said comparing.

2. The method of claim 1, wherein transmitting at least a first signal includes transmitting an audio signal.

3. The method of claim 1, wherein receiving the first signal includes receiving an audio signal.

4. The method of claim 1, wherein said end-to-end performance characteristic includes at least one of the following: signal distortion, signal duplication, signal intensity, and signal-to-noise ratio.

5. The method of claim 1, further comprising generating a reference signal using a Stratum-2 oscillator.

6. The method of claim 5, further comprising providing said reference signal to said first and second clocks.

7. The method of claim 1, wherein said first point of said communication network is a customer premise equipment.

8. The method of claim 1, wherein said second point of said communication network is a customer premise equipment.

9. The method of claim 1, wherein recording a first time value is performed using an oscillator that is configured to provide a local timing point of reference at the first point of the communication network, and wherein recording a second time value is performed using an oscillator that is configured to provide a local timing point of reference at the second point of the communication network.

10. The method of claim 1, wherein said second point of said communication network is a device within a second central office.

11. The method of claim 1, further comprising receiving a clock signal at said first and second clocks.

12. The method of claim 11, wherein said clock signal is received from a satellite.

13. A system for testing a communication network, comprising:
a signal generator for providing a first signal to a first point of said communication network and for obtaining a first measurement of at least one performance characteristic of the first signal at the first point of the communication network;
a first clocking device coupled to said signal generator, wherein said first clocking device records a first time said first signal is provided to a first point of said communication network, wherein the first clocking device is for correlating the first measurement with the first time value;
a signal receiver for receiving the first signal from at least a second point of said communication network, the second point of the communication network being remote from the first point of the communication network, wherein the signal receiver is for obtaining a second measurement of the performance characteristic of the first signal as received at the second point of the communication network; and
at least a second clocking device coupled to said signal receiver, wherein said second clocking device records a second time said first signal is received from said communication network, wherein the second clocking device is for:
correlating the second measurement with the second time value,
comparing said first measurement and said second measurement of the performance characteristic as a function of said first and second time values, and
determining at least one end-to-end performance characteristic of said communication network based on said comparing;
wherein said first and second clocking devices include respective oscitlators that are local to the first and second points of the communication network, and that operate from a substantially similar reference to provide respective local timing points of reference for the first and second points of the communication network.

14. The system of claim 13, further comprising a clock signal in communication with said first and second clocking devices such that said first and second clocking devices operate from a substantially similar reference.

15. The system of claim 14, further comprising a first satellite receiver in communication with said first clocking device, and a second satellite receiver in communication with said second clocking device, wherein said satellite receivers receive said clock signal from a satellite.

16. The system of claim 13, wherein said first and second clocking devices exhibit long-term frequency stability characteristics at least as good as a Stratum-2 level.

17. The system of claim 13, further comprising a first customer premise equipment in communication with said signal generator and said communication network.

18. The system of claim 13, further comprising a second customer premise equipment in communication with said signal receiver and said communication network.

19. A system for testing a communication network, comprising:
a signal generator for providing at least a first signal to a first point of said communication network, and for obtaining a first measurement of at least one performance characteristic of the first signal at the first point of the communication network;
at least a first clocking device coupled to said signal generator, wherein said clocking device records a first time said signal is provided to at least a first point of said communication network, wherein the first clocking device is for correlating the first measurement with the first time value;
wherein said clocking device includes an oscillator that is local to the point of the communication network, and that operates from a reference to provide a local timing point of reference for the first point of the communication network; and
a signal receiver for receiving the first signal from at least a second point of said communication network, the second point of the communication network being remote from the first point of the communication network, wherein the signal receiver is for obtaining a second measurement of the performance characteristic of the first signal as received at the second point of the communication network;
at least a second clocking device coupled to said signal receiver, wherein said second clocking device records a second time said first signal is received from said communication network, wherein the second clocking device is for:
correlating the second measurement with the second time value,
comparing said first measurement and said second measurement of the performance characteristic as a function of said first and second time values, and determining at least one end-to-end performance characteristic of said communication network based on said comparing; and wherein said second clocking devices includes at least a further oscillator that is local to the second point of the communication network, and that operates from a substantially similar reference as the oscillator, wherein the oscillator and the further oscillator provide respective local timing points of reference for the first and second points of the communication network.

* * * * *